United States Patent Office 3,490,019
Patented Jan. 13, 1970

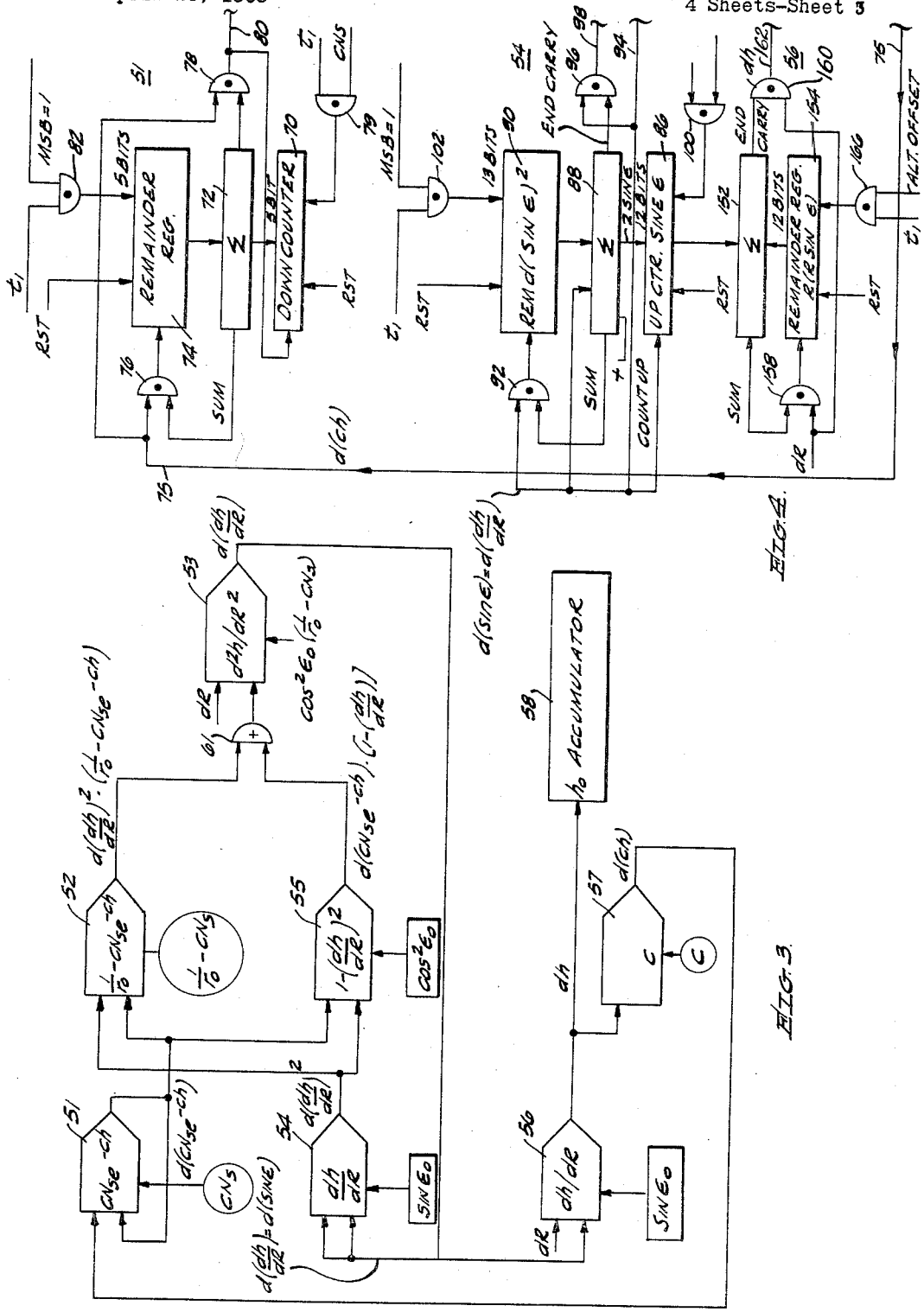

3,490,019
TIME COINCIDENT PRECISION HEIGHT
DETERMINING SYSTEM
David C. Jessen, Anaheim, and Thomas F. Alexander,
Bellflower, Calif., assignors to Hughes Aircraft Company, Culver City, Calif., a corporation of Delaware
Filed Apr. 23, 1968, Ser. No. 723,490
Int. Cl. G01s 9/06
U.S. Cl. 343—13
11 Claims

ABSTRACT OF THE DISCLOSURE

A height finding system that provides atmospheric corrected precision height information along a radar transmission path simultaneously with the radar beam propagation. A second order nonlinear differential equation is developed that accurately accounts for and provides height along the radar path as a function of range refraction coefficients and transmission angle. The solution is provided by digital integration in a closed servo system utilizing a plurality of differential generators and accumulators together. The system operates in response to the range counter which may have a count rate similar to the clock rate so that a rapid and highly accurate height determination is continually provided.

Background of the invention

This invention relates to height finding systems such as may be utilized with a radar system or a ray tracing calculator and particularly to a precision height determining system that is relatively fast operating and highly accurate.

Conventional height finding systems for use with radar employ a trigonometric relation with a 4/3 earth radius approximation as the effective earth's radius to compensate for the atmospheric effects, which calculations only have accuracy for a standard surface refraction index ($N_s$) value of 313. Because the refractive index varies over a wide range as a function of temperature, pressure, humidity and other atmospheric conditions, height determinations using this approximation are highly inaccurate. Another known height finding technique is to utilize a general purpose computer containing information from the National Bureau of Standards tables of surface refractive index as a function of height and range for each elevation angle. This computer method requires excessive memory storage, substantially exclusive use of the computer and excessive calculation time for determining each height so as to be unable to perform real time calculations. A system capable of accurately determining height information in substantial time coincidence with the radar energy transmissions would be highly desirable for controlling height displays and for providing data to use in correlation calculations. Also, it would be very desirable if the height finding system included a minimum of equipment and operated substantially without memory requirements.

Summary of the invention

Briefly, the height finding system in accordance with the principles of the invention utilizes a refractive model that assumes a cool exponential atmosphere with the height expressed as a second order nonlinear differential equation which is solved by successive approximations in a digital closed loop servo system. A plurality of digital integrators including differential generators and accumulators are intercoupled and controlled by the radar range counter so that height determinations are provided simultaneously with the radar beam propagation. Also in accordance with the invention an arrangement is provided to develop double precision values of height with a minimum of complexity. Although the system is illustrated in a radar system, it is to be understood that the principles of the invention are applicable to any suitable energy reception system and to ray tracing calculators and other similar devices.

It is therefore an object of this invention to provide a simplified system for developing precision height distance information relative to a reference plane.

It is a further object of this invention to provide an improved height finding computer that develops height information of positions in space or in the atmosphere substantially in time coincidence with radar beam propagation.

It is another object of this invention to provide a closed loop digital integration system for determining height information in the earth's atmosphere.

It is still another object of this invention to provide a height finding system that is reliably provided as a function of the most significant atmospheric refraction parameters.

It is a further object of this invention to provide an improved height finding computer utilizing digital differential analyzers.

It is a still further object of this invention to provide a system for rapidly developing closed loop solutions of second order nonlinear equations.

Description of the drawings

The novel features of the invention, as well as the invention itself, both as to its organization and method of operation, will best be understood from the accompanying description, taken in connection with the accompanying drawings, in which like reference characters refer to like parts, and in which:

FIG. 3 is a schematic block diagram of the height finding computer in accordance with the invention;

FIGS. 4 and 5 are detailed block diagrams for further explaining the height finding computer of FIG. 3.

Description of the preferred embodiment

Figure 1:
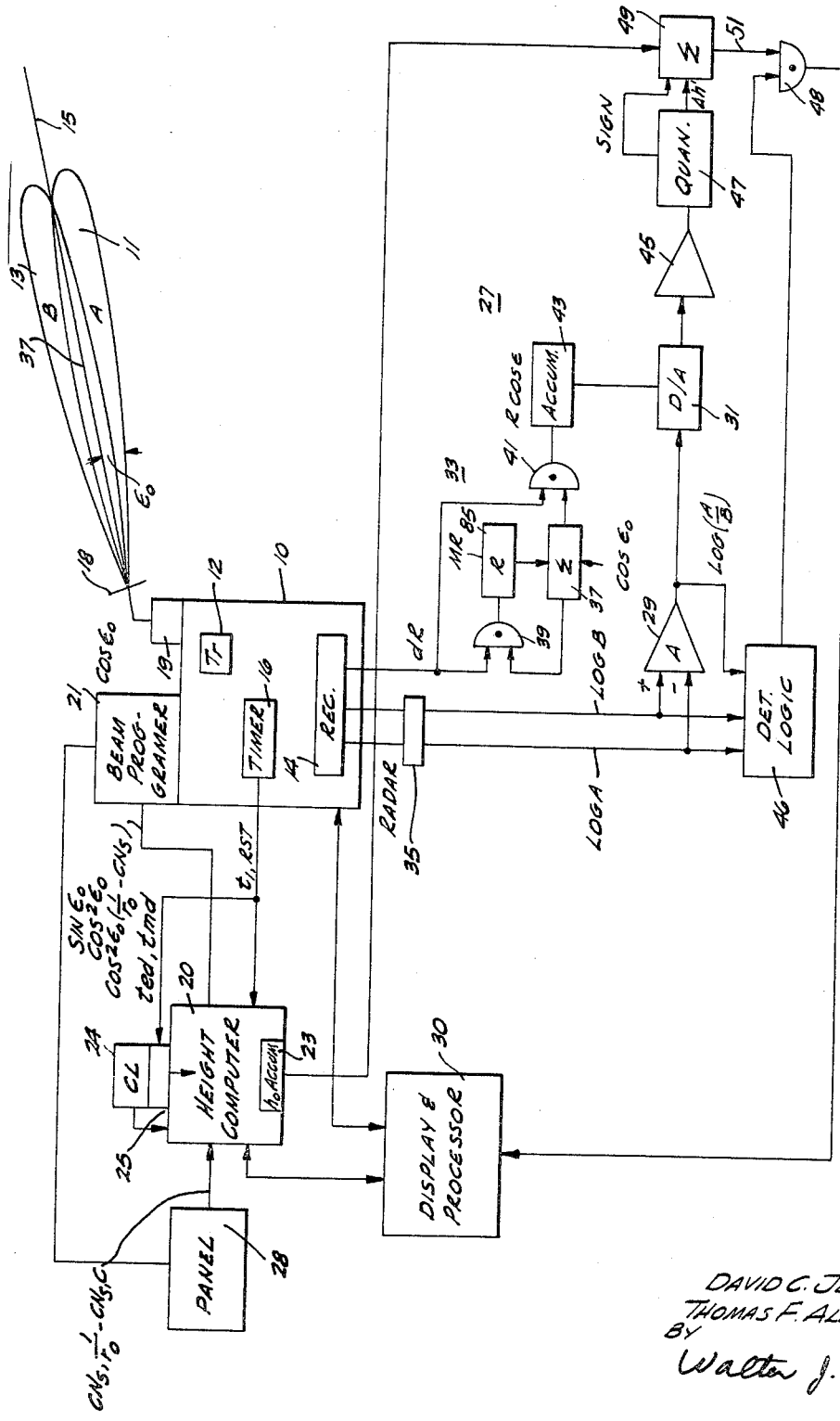
FIG. 1 is a schematic block diagram of a radar system including the height finding computer system in accordance with the invention.

Referring first to FIG. 1, the height finding system of the invention includes a radar system 10 having a transmitter 12, a receiver 14 and a timing source 16 therein as are well known in the art. Pulses of energy may be transmitted from an antenna 18 at an elevation angle $\epsilon_0$ relative to the horizontal plane, which angle is positive for an up-looking radar system. The antenna 18 may be of the monopulse type for obtaining a difference signal in the elevation dimension. A height finding computer 20, in accordance with the invention, responds to a timing signal $t_1$ and a master reset signal MR from the timer 16. A master trigger signal $t_{md}$ representing the start of video time and a signal $t_{ed}$ representing the end of live time are applied from the timer 16 to a gate 25 for controlling the transfer of range clock pulses $dR$ to the computer 20. The height computer 20 also receives signals $\sin \epsilon_0$ and $\cos^2 \epsilon_0$ from the beam programmer 21 and signals $c$, $cN_s$ and $$\left(\frac{1}{r_0} - cN_s\right)$$

from an entry panel 28 which receives and retains atmospheric and other data required in the system of the invention. The panel 28 is also coupled to the beam programmer 21 so that the term $$\cos^2 \epsilon_o \left(\frac{1}{r_o} - cN_s\right)$$

is applied to the computer 20. The signals and terms applied to the height computer 20 will be subsequently explained in further detail. The clock source 24 also applies clock signals to the various gates, flip flops and other digital elements utilized in the height computer 20. An $h_o$ accumulator register 23 in the computer 20 accumulates the height of the radar ray path at each range interval $dR$.

In the illustrated system, the accumulated height $h_o$ in the register 23 represents the height along the ray path 15 between two beams 11 and 13 transmitting at elevation angles $\epsilon_o$. It is to be noted that the principles of the invention are applicable to determining height distance above or below a reference plane. Two receiver systems provide two channels for receiving signals A and B which are transmitted at different frequencies from the antenna 18 which may be a frequency scan array and thus at different angles. A delay element 35 results in the two signals being converted into time coincident video signals A and B in a logarithmic form. In order to display or utilize this height information relative to targets or objects in space, a height difference determining system 27 is provided to generate the height $\Delta h'$ (FIG. 2) representing the height difference between the ray path 37 and an object. A difference amplifier 29 responds to video signals log A and log B to apply a signal $A - B$ to a digital to analog $(D/A)$ converter 31. It is to be noted that in the illustrated radar system the energy from two portions of a transmitted pulse are processed in separate channels or receivers to provide log A and log B as time coincident video signals for amplitude difference comparison. Because $\Delta h' \cong \Delta \epsilon R \cos \epsilon$ and $\Delta \epsilon$ is equal to log $A/B$ as provided at the output of the differential amplifier 29, the term R cos $\epsilon$ is developed in a differential integrator including an R register 85, a full adder 37, "and" gate 39 and an "and" gate 41. The term cos $\epsilon_o$ is applied from the beam programmer 21 as a constant to the adder 37 and when added to the contents of the R register, the sum is applied through the "and" gates 39 in coincidence with $dR$ to be accumulated in the R register 85. The range term $dR$ is also applied to the gate 41 to apply overflow pulses which are accumulated as R cos $\epsilon$ to an accumulator register 43. The digital multiplier operation of the integrator 33 will be explained subsequently in further detail. The amplitude value of the R cos $\epsilon$ term attenuates the converter 31 to effectively provide a multiplication of $\Delta \epsilon R \cos \epsilon$, as is well known in the art, which term is applied through an amplifier 45 to a properly timed quantizer 47 to develop the term $\Delta h'$ in digital form. An adder 49 responds to $h_o$ from the accumulator 23 and $\Delta h'$ which is accompanied with a sign bit to provide a height of object term on a lead 51. An "and" gate 48 responds to the height information and a valid target signal from a detector logic system 46 to apply the digital height of object data to the display and processor unit 30. As is well known in the art, the detector logic system 46 may respond to the video signals to determine if a predetermined amplitude difference is exceeded so as to detect a hit or target and may utilize statistical requirements before developing a valid target signal.

The height information together with other radar information is transferred to the display and processor system 30 where the real time height data is highly desirable for displays or for navigation and interception calculations. It is to be noted that the height information may be utilized only for display or for calculations or in any desired manner in accordance with the invention. If the data is displayed numerically, it may be converted to the decimal system.

Although the illustrated system utilizes a frequency scan array, and two receiver channels to provide an effective monopulse operation, other arrangements such as a monopulse antenna utilized when tracking a target so that the height is provided of objects on the antenna boresight axis. In other arrangements in accordance with the invention, separate pencil beams are sequentially transmitted to determine the elevation angle of the ray path.

Figure 2:
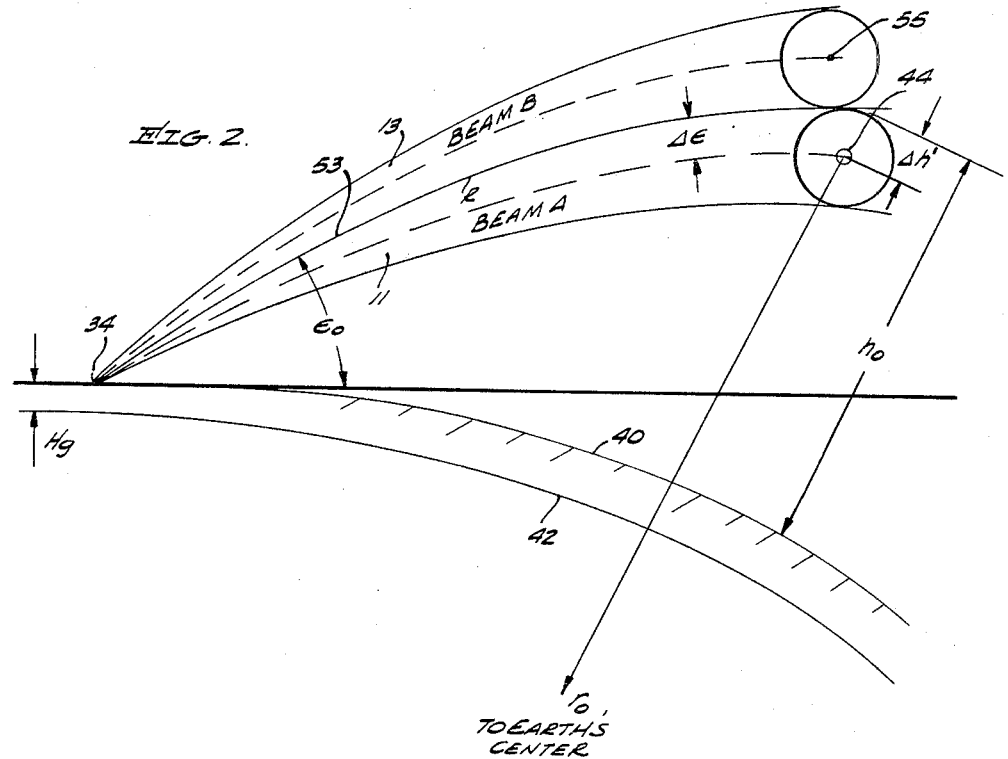
FIG. 2 is a schematic diagram for explaining some of the variables utilized in the radar system in accordance with the invention.

Referring now to FIG. 2, a radar system 34 is shown transmitting beams 11 and 13 or respective beams A and B at an angle $\epsilon_o$ into the atmosphere, the beam paths having a curvature that is a function of the atmospheric refraction characteristics. The radar system 34 may be on a height curvature 40 at a height $H_g$ above the reference curvature 42 which may be sea level, for example. The height above the earth surface 40, of an object such as 44 from which radar energy is returned, is designated as $h_o$ and the distance of the object 44 below a ray path 53 is $\Delta h'$. The ray path 53 represents the path of equal energy between the two beams 11 and 13. The height $h_o$ is measured above the earth surface 42 which height is a portion of the radius $r_o$ from the center of the earth. The height $H_g$ represents the difference between the surface 40 and the reference curvature 42. An object at a position such as 55 has a height that is $\Delta h'$ added to the height $h_o$ rather than subtracted therefrom for an object such as 44.

Referring now to FIG. 3, the time coincident height determining system will be further explained in accordancce with the invention. As is well known in the art, the height of an object could be readily obtained by the law of cosines except that the refraction of the atmosphere causes excessive errors, especially at large ranges. Also, any determination of height utilizing an average or a standard value of surface refraction index has been found to be substantially inaccurate except during certain specific atmospheric conditions. The system of the invention simulates the refractive characteristics of a cool exponential atmosphere developed by the National Bureau of Standards by Taylor series expansions. The refractive model of the invention may be expressed as:

$$\frac{d^2h}{dR^2} = \left[1 - \left(\frac{dh}{dR}\right)^2\right]\left[\frac{1}{r_{o\text{Th}}} + \frac{1}{\eta}\frac{dn}{dh}\right] \quad (1)$$

where:

$h$ = height above mean sea level;
$R$ = slant range;
$r_o$ = mean earth's radius;
$N_s$ = surface refraction index; and
$\eta$ = refractive index $(1 + N_s \times 10^6)$.

For an approximation, $$r_o + h \simeq r_o \text{ and } \frac{1}{\eta}\frac{dn}{dh} \simeq -cN_s e^{-ch}$$

where $c$ is the exponential decay constant. Equation 1 can then be expressed in integral form as:

$$h = \int_0^R \int_0^R \left[1 - \left(\frac{dh}{dR}\right)^2\right]\left[\frac{1}{r_o} - cN_s e^{-ch}\right] dR dR \quad (2)$$

Referring now to FIG. 3, a plurality of function generators 51 to 57 are provided in accordance with the invention with feedback paths to provide the double precision time coincident height determination in accordance with the invention. The generators 51 and 57 generate the exponential term $d(cN_s e^{-ch})$ for the cool exponential atmospheric model so as to modify the refractive index as a function of altitude. The generator 51 functions as an exponential generator in combination with the integrator 57 which functions as a differential or ramp generator. The generator 57 responds to the exponential decay constant $c$ and to the height derivative $dh$ to develop the term $d(ch)$. The generator 51 responds to the term $d(ch)$ and $cN_s$ to generate the exponential term $(cN_s e^{-ch})$. The generator 53, which is a first derivative generator, generates the differential of the first derivative of height with respect to range $$d\left(\frac{dh}{dR}\right)$$

in response to $dR$ and an initial condition $$\cos^2 \epsilon_o \left(\frac{1}{r_o} - cN_s\right)$$

which is counted up in response to the generators 52 and 55, which generate the differential of the second derivative. The generator 54 develops the differential of the second derivative squared term $$d\left(\frac{dh}{dR}\right)^2$$

in response to the first derivative term and an angular term sin $\epsilon$. The generators 52, 53 and 55 form the product of two variables. The generator 56 develops height increments $dh$ which are summed in an accumulator 58 to continually provide the instantaneous height of the ray path or of an object being illuminated by the radar. Each of the function generators 51 to 56 with subsequent accumulation provides an integration. The function generator 57 which is utilized to strobe the generator 51 does not develop an integral term.

The height computer system in accordance with the invention utilizes digital integrators or digital differential analyzers as are well known in the art. A typical digital integrator includes a Y register which contains the current or present value of the integrand, a digital full adder and an R register which contains the accumulation of the partial areas or increments. The integrand in the Y register may be a constant in which case the input $\Delta Y = 0$ or it may be variable so that the Y register must count $\Delta Y$ increments. The full adder responds to the contents of the Y register and $\Delta X$ increments, which may be time increments, to develop a sum which is stored in the R register. The contents of the Y register may be expressed as $Y = Y_o + \Sigma \Delta Y$ where $Y_o$ is the initial value in the Y register, and the contents of the R register may be expressed as $R = R_o + \Sigma Y \Delta X - \Sigma \Delta Z$ where $R_o$ is the initial value in the R register and where $\Delta Z$ is the value of the overflow. During the process of integration when the integrator continually adds Y to R, the R register will overflow as soon as the capacity of R is exceeded. The overflow signals are the increments $\Delta Z$ which are accumulated by a Z accumulator. In essence, the Z accumulator and the R register may be considered as one long accumulator. The contents of the Z accumulator may be expressed as $Z = Z_o + \Sigma \Delta Z$. In the system of the invention, the Y register, the adder and the R register are utilized as a function generator such as a differential generator, a digital differential analyzer, or an exponential generator, with the accumulators being at different positions when utilized. The function generators of the invention utilize a strobe input term which is effectively multiplied by the contents of the integrand in the Y register to form a differential multiplier.

Figure 5:
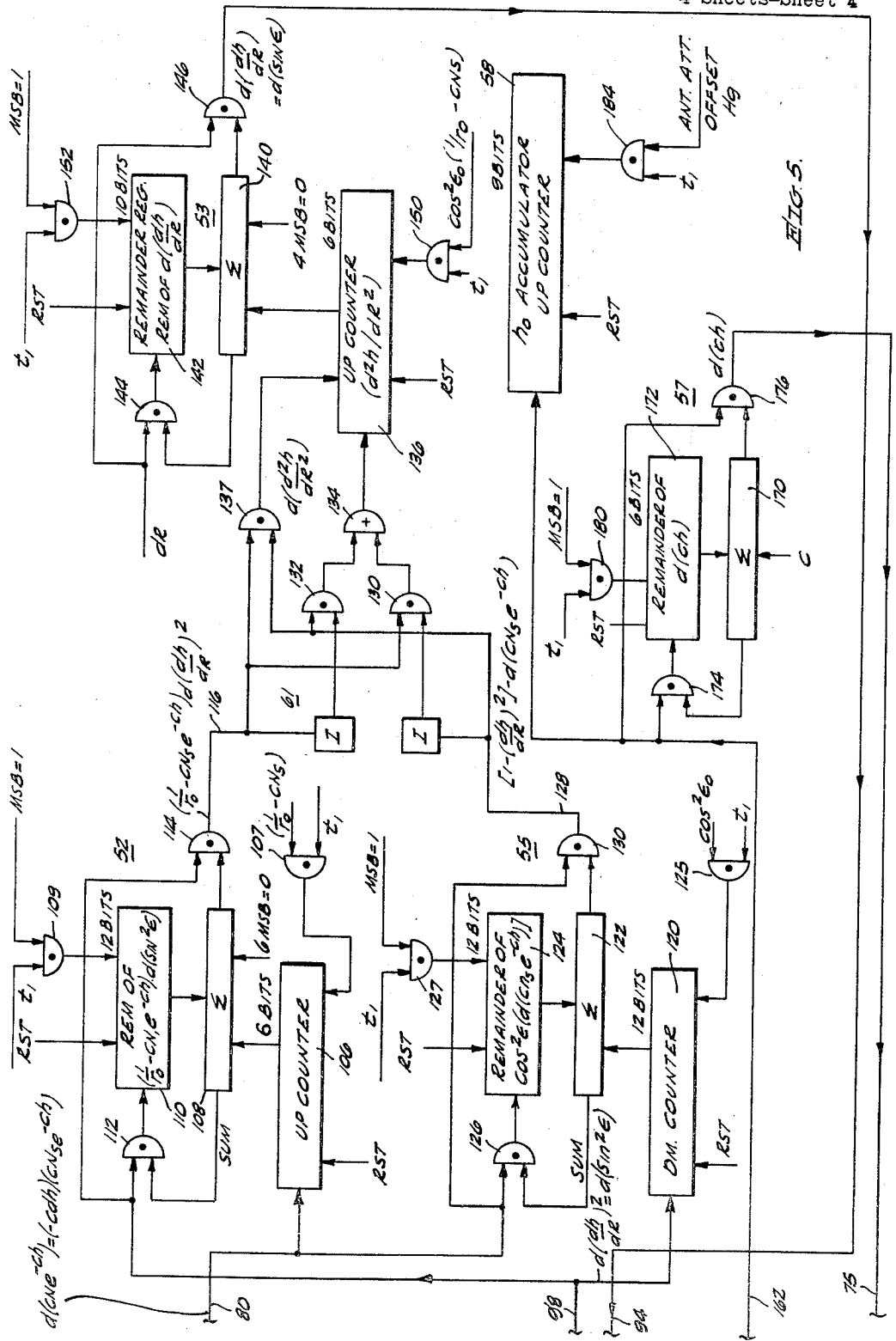

Referring now to FIGS. 4 and 5, the exponential generator 51 includes a down counting Y register 70, a full adder 72 and an R register 74. The strobe term $d(ch)$ is applied to "and" gates 76 which gate the sum bits from the adder 72 to the R register 74, which can be performed serial or parallel. Also, the strobe term $d(ch)$ is applied to an "and" gate 78 which gates the end carry to a lead 80, the latter of which is coupled to the flip flop representing the least significant bit of the register 70 to count down the contents thereof. At an initial time $t_1$ prior to each radar live time, the exponential register 70 is loaded through gates 79 with $cN_s$ which is the exponential decay constant times the surface refractive index of the atmosphere at the elevation of the radar system and represents the proper initial condition required. Prior to time $t_1$, the registers 70 and 74 are reset to zero by a master reset pulse RST. For roundoff to minimize system errors, the register 74 is initially set at time $t_1$ to a one-half full count through a gate 82 so that the most significant bit of register 74 is a "one." The generator 51 develops the term $d(cN_s e^{-ch})$ which is equal to $(-cdh)(cN_s e^{-ch})$. The registers 70 and 74 may each have 5 bit positions or flip flops when required for system scaling as will be discussed subsequently.

The function generator 54 includes a Y register 86 which is an up-counter and accumulates the value of sin $\epsilon$, a full adder 88 and an R register 90. In order to transfer 2 sin $\epsilon$ to the adder 88 from the 12 bit counter 86, the adder 88 has 13 bits with the least significant bit input from the counter 86 maintained at a "one" from a source of reference potential. Because the R register 90 contains 13 bits, the sum provided by the adder and the offset contents of the counter 86 includes twice the contents of the counter 86. A carry is injected from the lead 94 as the second input to the least significant bit position of the adder 88. It is to be noted that the carry inject may also be provided by a source of reference potential. A plurality of strobe gates 92 respond to a term $$d\left(\frac{dh}{dR}\right)$$

on a lead 94 to transfer the 13 bits of the sum to the R register 90. As the term $dh/dR$ is equal to sin $\epsilon$, the term $$d\left(\frac{dh}{dR}\right)$$

is equal to $d(\sin \epsilon)$. Also, the pulses on the lead 94 are applied to the counter 86 to provide an up-counting operation to incrementally increase sin $\epsilon$. An "and" gate 96 transfers the end carry from the adder 88 to a lead 98 in time coincidence with the strobe pulse on the lead 94 during each radar live time. At time $t_1$, sin $\epsilon_o$ is loaded into the counter 86 through "and" gates 100 and a "one" for roundoff is loaded into the most significant bit position of the R register 54 through an "and" gate 102. The function generator 54 responds to $d(\sin \epsilon)$ $$\left(\text{or to } d\left(\frac{dh}{dR}\right)\right)$$

to develop $$d\left(\frac{dh}{dR}\right)^2$$

which is equal to $d(\sin^2 \epsilon)$.

For developing the second derivative term $d^2h/dR^2$ by accumulation in the Y register of the function generator 53, a calculation of the form $d(\mu V) = \mu dV + V d\mu$ (initial conditions $\mu_o V_o$ are inserted at time $t_1$) is utilized to obtain the product of the terms:

$$\left[1 - \left(\frac{dh}{dR}\right)^2\right]\left[\frac{1}{r_o} - cN_s e^{-ch}\right]$$

which may respectively correspond to $\mu$ and $v$. Thus $\mu_o V_o$ being the initial terms entered into the counter 136.

$$\mu = \left[1 - \left(\frac{dh}{dR}\right)^2\right]$$

$$d\mu = d\left[1 - \left(\frac{dh}{dR}\right)^2\right] = d(1) - d\left(\frac{dh}{dR}\right)^2 = -d\left(\frac{dh}{dR}\right)^2$$

$$V = \left(\frac{1}{r_o} - cN_s e^{-ch}\right)$$

$$dV = d\left[\frac{1}{r_o} - cN_s e^{-ch}\right] = d\left(\frac{1}{r_o}\right) - d(cN_s e^{-ch})$$

$$= -d(cN_s e^{-ch})$$

Therefore:

$$\mu dv = -\left[1 - \left(\frac{dh}{dR}\right)^2\right](cN_s e^{-ch})$$

which is the term developed on lead 116.

$$V du = -\left[\frac{1}{r_0} - cN_s e^{-ch}\right] d\left(\frac{dh}{dR}\right)^2$$

which is the term developed on lead 128. Thus the differential value accumulated in the Y register of the generator 53 is equal to $d(uv)$ or the product of the two terms of the derivation model plus the initial term.

The function generator 52 includes a Y register 106, a full adder 108 and an R register 110. The lead 80 is coupled to the least significant bit position of the register 106 to provide an up-counter and the R register 110 responds to the sum applied from the adder 108 through "and" gates 112 which are strobed with the term on the lead 98. The end carry signal from the adder 108 is applied through an "and" gate 114 to an output lead 116

$$\left(\frac{1}{r_0} - cN_s e^{-ch}\right) \cdot d\left(\frac{dh}{dR}\right)^2$$

in coincidence with the term on the lead 98. After being reset, the registers 106 and 110 are respectively initially loaded at time $t_1$ through "and" gates 107 and 109, with $$\left(\frac{1}{r_0} - cN_s\right)$$

and with a most significant bit of register 110 set to "one" for roundoff. The Y register 106 accumulates the term $$\left(\frac{1}{r_0} - cN_s e^{-ch}\right)$$

which is multiplied by $d(\sin^2 \epsilon)$ and transferred to the R register 110. The term $$\left(\frac{1}{r_0} - cN_s e^{-ch}\right) d\left(\frac{dh}{dR}\right)^2$$

is applied to the lead 116 as overflow.

The function generator 55 includes a Y register 120 operating as a down-counter, a full adder 122 and an R register 124. The Y register 120 responds to pulses on the lead 98 to count down and the R register 124 receives the sum from the adder 122 through "and" gates 126 in response to the strobe pulse on the lead 80. The end carry or overflow is applied from the adder 122 to a lead 128 through an "and" gate 130 in coincidence with the term on the lead 80. The Y register 120 contains the term $$\left[1 - \left(\frac{dh}{dR}\right)^2\right]$$

or $\cos^2 \epsilon$, the R register 124 accumulates the remainder of the term $$\cos^2 \epsilon[d(cN_s e^{-ch})]$$

and the term $$\left[1 - \left(\frac{dh}{dR}\right)^2\right][d(cN_s e^{-ch})]$$

is applied to the lead 128 as overflow pulses.

The registers 120 and 124 respond to respective "and" gates 125 and 127 at time $t_1$ to respectively load in $\cos^2 \epsilon_0$ and a most significant bit of "one."

In order that pulses from both the generators 52 and 55 may be accumulated in a Y register 136 of the generator 53, the "or" gate structure 61 includes an "and" gate 130 responsive to a pulse on the lead 116 and an inverted form of a pulse on the lead 128. An "and" gate 132 is responsive to a pulse on the lead 128 and an inverted form of a pulse on the lead 116. An "or" gate 134 is responsive to either gates 130 or 132 to increase by one the count in the register 136. If overflow pulses occur simultaneously from both generators 52 and 55, an "and" gate 137 applies a pulse to the register 136 for controlling the logic therein to increase its count by two. The pulses generated by the gates 134 or 137 represent $$d\left(\frac{d^2h}{dR^2}\right)$$

With the function $d^2h/dR^2$ accumulated in the Y register 136, the function or the differential of the first derivative generator 53 develops the term $$d\left(\frac{dh}{dR}\right)$$

in response to a range strobe pulse $dR$. A full adder 140 receives the 6 bit contents of the Y register 136 with the 4 most significant bits of the adder receiving zeros at the Y register input terminals, such as from a reference potential source, for scaling of function generation. The sum is transferred through a plurality of "and" gates 144 in coincidence with a strobe pulse $dR$, to the R register 142. An "and" gate 146 transfers the overflow or end carry pulse to a lead 94 in coincidence with the strobe pulse of the term $dR$. At time $t_1$, "and" gates 150 transfer the term $\cos^2 \epsilon_0$.

$$\cos^2 \epsilon_0 \left(\frac{1}{r_0} - cN_s\right)$$

into the Y register 136 and an "and" gate 152 transfers a "one" into the most significant bit position of the R register 142. Thus, the differential of the first derivative $$d\left(\frac{dh}{dR}\right)$$

is generated as overflow pulses and applied to the lead 148.

The height function generator 56 responds to $\sin \epsilon$ or $dh/dR$ and to the range pulse $dR$ to develop height differentials $dh$. The Y register 86 of the generator 54 is utilized in common with the generator 56 with the contents of the register 86 being transferred without multiplication to a full adder 152. An R register 154 of the generator 56 receives the sum from the adder 152 through a plurality of "and" gates 158 coincident with the strobe term $dR$. An "and" gate 160 transfers the overflow or end carry pulses to a lead 162 in coincidence with the term $dR$. The R register 154 responds to "and" gates 166 at times $t_1$ to load antenna altitude offset values $H_g$ therein. It is to be noted that the illustrated R register and full adder contains 12 bits so that adding a "one" at the three positions starting with the most significant bit position, adds initial respective values of 125 feet, 62.5 feet and 31.25 feet with scaling as indicated later.

The function generator 57 which develops the differential term $d(ch)$ for strobing the function generator 51, includes a full adder 170 responsive to the constant $c$ and to the contents of the remainder of $d(ch)$ of a remainder register 172. An "and" gate 174 transfers the sum from the adder 170 to the R register 172 in coincidence with the term $dh$ on the lead 162. The overflow pulses from the adder 170 are applied to the lead 75 through an "and" gate 176 in coincidence with the term $dh$. At time $t_1$ the R register 172 may be loaded one-half full in response to an "and" gate 180 for round off purposes.

The differential height $dh$ is accumulated in the accumulator up-counter 58 to provide the height $h_0$ of the ray path relative to sea level, for example. It is to be understood that this 250 feet increment is an illustrative example and any increments may be utilized within the scope of the invention. If the accumulator 58 contains 9 bit positions, the least significant bit represents 250 feet which may be added as radar site height $H_g$ at time $t_1$ through "and" gates 184. The height $h_0$ utilized may be derived both from the accumulator 58 and from the R register 154 for a higher degree of precision or accuracy.

The system scaling is performed so that the calculated height has a selected degree of accuracy. In the illustrated system, a 250 feet range bin interval has been selected so that an accurate determination of height may be performed each 250 feet in slant range. The height interval $dh=1$ unit $=2°$ and by definition 1 unit $=250$ feet. The illustrated system is designed for a surface refractive index defined within the limits:

$$200\times10^{-6}\leq N_s\leq 440\times10^{-6}$$

The calculation is for a maximum surface refractive index at $N_s$ of $440\times10^{-6}$. For the weight of the output term of the generator 57, the LSB of $c$ is first selected by considering the accuracy of the exponential generation, to be $2^{-10}$. The value of $c$ from the standard atmospheric tables at the maximum value of $N_s=.0163906392/250$ feet $=(0.000\ 001\ 000\ 011\ 001\ 000\ 101)_2$. The weight of the MSB is $2^{-6}$ because of the accuracy of the surface refractive index. The weight of the overflow $cdh$ is equal to the weight of $c_{\text{MSB}}+1$ times the clocking function weight $2°$. Thus the weight $d(ch)=2^{-6+1}\times2°=2^{-5}$.

To determine the weight of the term at the output of the generator 51, $cN_s$ is first determined at $N_s=440\times10^{-6}$, to be equal to $0.000\ 007211/250$ feet or $(.000\ 000\ 000\ 000\ 000\ 001\ 111\ 000\ 111\ 111\ 101)_2$. The weight of the $\text{MSB}=2^{-18}$. The overflow, which is the weight of the MSB times the clock function or the weight of $$d(cN_se^{-ch})=2^{-18+1}\times2^{-5}=2^{-17(+)-5}=2^{-22}$$

at $h=0$. Thus the LSB of $cN_se^{-ch}$ weight $=2^{-22}$. The accumulator or Y register 106 is 5 bits required by the range from $2^{-18}$ to $2^{-22}$ inclusive.

To determine the required size of the Y register of the generator 52, the term $$\left(\frac{1}{r_o}-cN_se^{-ch}\right)$$

is calculated at $h=\infty$ where it is a maximum value.

$$\frac{1}{r_o}=0.0001196/250\text{ feet}=(.000\ 000\ 000\ 000\ 000\ 011\ 001\ 000\ 101\ 010)$$

The MSB of $$\frac{1}{r_o}=2^{-17}$$

The LSB of $$\frac{1}{r_o}-cN_se^{-ch}=\text{weight }d(cN_se^{-ch})=2^{-22}$$

Thus the Y accumulator 106 of the generator 52 has a capacity of 6 bits.

To determine the weight of the output term of the generator 55, the $\cos^2\epsilon_o$ $\text{MSB}=2^{-1}$. The binary weight of the overflow value of $$\cos^2\epsilon_o d(cN_se^{-ch})=2^{-1+1}\times wtd(cN_se^{-ch})=2°\ 2^{-22}=2^{-22}$$

The LSB of $$\cos^2\epsilon_o\left(\frac{1}{r_o}-cN_se^{-ch}\right)=\frac{d^2h}{dR^2}=2^{-22}$$

weight. The MSB weight=weight of $$\frac{1}{r_o}=2^{-17}$$

Thus the weight of the output terms of both generators 52 and 55 is the same or 6 bits as in the Y accumulator 136.

For determining the weight of the output term from the generator 54 and the size of the Y register 120 of the generator 55, it is assumed that $\sin\epsilon_o$ is a 12 bit number by considering the straight line error at maximum range with one-half bit error. Thus the LSB of $$\sin\epsilon_o=2^{-12}$$

and MSB of $\sin\epsilon_o=2^{-1}$. The weight of $$d\left(\frac{dh}{dR}\right)=\text{weight of }d(\sin\epsilon)=2^{-12}$$

As a result, the Y register 86 of the generator 54 contains 12 bit positions. The $\sin^2\epsilon_o$ weight maximum $=2^{-1}$ and the overflow weight $$d(\sin^2\epsilon_o)=(2^{-1+1})\text{ weight }d\left(\frac{dh}{dR}\right)=2°\times2^{-12}=2^{-12}$$

The term $d(\sin^2\epsilon_o)$ provides an update for $$\left(1-\frac{d^2h}{dR^2}\right)=d(\cos^2\epsilon_o)=2^{-12}$$

Thus $\cos^2\epsilon_o$ is a 12 bit number and the Y register 120 contains 12 bits.

To determine the size of the R register 142 of the generator 53, it will be determined the increased length of the R register over the Y accumulator. As $$d\left(\frac{dh}{dR}\right)\text{ weight}=2^{-12},\text{ MSB of }d\left(\frac{dh}{dR}\right)$$

integrator remainder register $=2^{-13}$. However, the MSB of Y register $136=2^{-17}$. The R register 142 is $$2^{-13}.2^{-(-17)}.2^4$$

Thus, the R register 142 is 4 bits longer than the Y register 136 or is equal to 10 bits in length.

The next scaling determination is to calculate the size of the R register 110 of the generator 52 which contains $$\left[\frac{1}{r_o}-cN_se^{-ch}\right]d(\sin^2\epsilon_o)$$

As previously determined, the MSB of $$\frac{1}{r_o}-cN_se^{-ch}=2^{-17}$$

The value of the overflow from the generator 55 is $2^{-22}$ and the value of $d(\sin^2\epsilon)=2^{-12}$. A scaler is found which allows the overflow to equal $$2^{-22}.2^{-17+1}.2^{-12}.2^{+n}=2^{-22}$$

Therefore, $$2^{+n}=2^{-22}.2^{+12}.2^{+16}=2^{-22+28}=2^6$$

Thus 6 more bits are required in the R register 110 than in the Y register 106.

The size of the registers in the generators 56 and 57 and the $h_o$ accumulator 23 were selected in a similar manner. It is to be understood that the values selected of the system scaling for matching the problem values with the corresponding machine values are only for purposes of illustration and other scaling values may be utilized within the scope of the invention.

Figure 6:
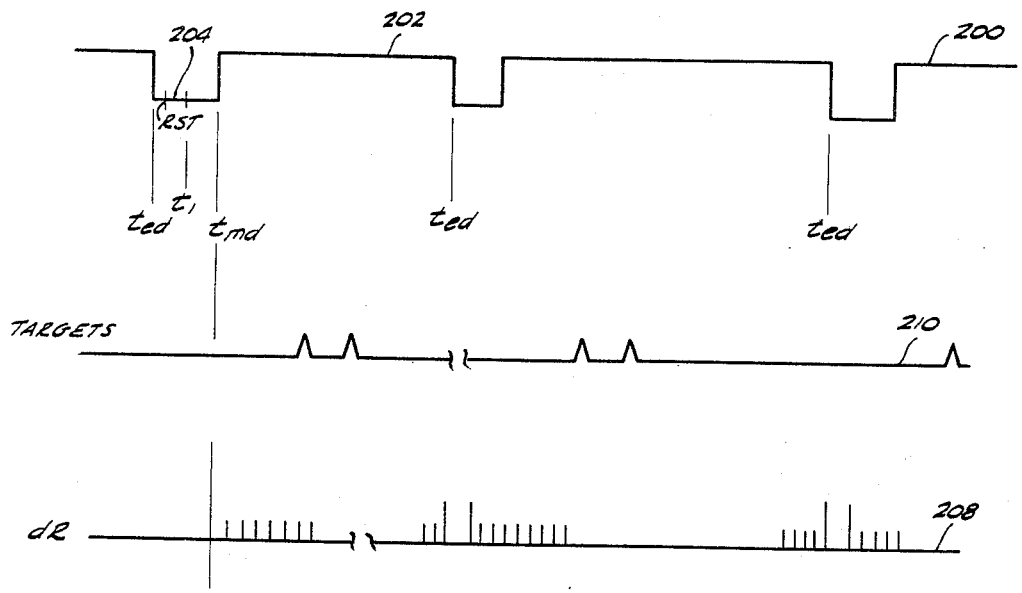
FIG. 6 is a schematic diagram of waveforms showing voltage as a function of time for further explaining the operation of the systems of FIGS. 1 and 3.

Referring now to FIG. 6, a waveform 200 shows the radar live time of a positive pulse 202 and the radar dead or inactive time of a negative pulse 204. The live time of the pulse 202 extends between master trigger time $t_{md}$ and the end of live time $t_{ed}$ and the radar "dead" time extends between time $t_{ed}$ and $t_{md}$, these periods being repeated for each transmission period. During each radar inactive period, a master reset pulse RST is applied to all registers for clearing them to start a calculation. At time $t_1$, all Y registers and R registers are filled with initial conditions as previously discussed relative to FIGS. 4 and 5. In response to transmitted pulses at time $t_{md}$ of sequentially different frequencies thereafter, the clock is gated by the gate 25 to apply clock pulses similar to that of a waveform 208 to the system and to apply $dR$ pulses of the waveform 208 with a calculation being performed during each clock period as the radar energy is propagated into space. In response to a valid target return pulse of a waveform 210, the height of the target is displayed or utilized. The system may respond to a plurality of target returns to display or utilize the height data being calculated along the ray path, once during each clock or $dR$ period that a return or a plurality of returns are received. During each live time period following time $t_{md}$, calculations are performed in real time during each $dR$ period representing the incrementally increasing range of energy transmission. If the clock rate is 1.967 mc. (megacycle), a height calculation is performed each .508 microsecond which represents approximately 250 feet. The input terms from the panel 28 which are $c$, $cN_s$ and $$\left(\frac{1}{r_o} - cN_s\right)$$

may be entered at desired intervals such as each half hour or each hour, depending upon the atmospheric conditions. The radar inputs $\sin \epsilon_o$, $\cos^2 \epsilon_o$ and $\cos^2 \epsilon_o$ $$\sin \epsilon_o, \cos^2 \epsilon_o \text{ and } \cos^2 \epsilon_o \left(\frac{1}{r_o} - cN_s\right)$$

are entered from the beam programmer at each time $t_1$.

During each $dR$ or clock period of any radar transmission time, the generator 51 operates to modify the refractive index as a function of altitude. The generator 57 develops the differential of height at the previously entered exponential decay constant, which derivative is utilized for modifying the refractive index in the generator 51. Thus the generators 51 and 57 develop the exponential term for a cool exponential atmosphere. The generator 53 develops the first derivative of height with respect to range and the generator 54 develops the second derivative of height with respect to range. The generators 52 and 55 with the accumulator register of the generator 53 formulate the product of the two variables to develop the term $d^2h/dR^2$. The generator 53 provides the angle change increments as a function of the refractive index. The generator 56 develops the height increments simultaneously with the radar beam propagation in response to each $dR$ pulse, which height increments are accumulated in the register 58 to represent the height along the ray path which with the antenna altitude offset $H_g$, represents the ray path height above sea level. When a valid target is provided by the detector logic of FIG. 1, the incremental height of the target above or below the ray path is also instantaneously added or subtracted to the ray path altitude and an output of the gates 48 may be displayed, utilized or stored elsewhere such as in unit 30.

Thus the height finding system in accordance with the invention develops the height along the ray path or a predetermined path as a function of range or time, refraction coefficients and initial transmission angle. The system develops the product of two variables, one containing the height differentials and the other the refractive index as a function of height, which are then integrated twice as a function of range to provide the height increments. The height value is pulse generated each count of the range counter, such that during each radar range sweep the height of the ray path is continually provided in time coincidence with the energy transmission and interception. A target detection arrangement allows heights to be selected of valid targets throughout the transmission range.

What is claimed is:

1. A system for determining height distance relative to a reference plane comprising:
   radar means for transmitting energy along a path,
   clock means, and
   computing means responsive to said radar means and said clock means for calculating height distance along said path during each of a plurality of clock intervals, said computing means including a first path for determining height changes and a second path for determining the atmospheric refractive index as a function of height.

2. A system for determining height in the atmosphere from a reference surface along an energy path as a function of range comprising:
   first means for developing a first term including the second derivative of height with respect to range,
   second means for developing a second term including the surface refractive index as an exponential function of height, third means for formulating the product of said first and second terms,
   fourth means for forming the first derivative of height with respect to range, and
   fifth means for forming height increments.

3. The combination of claim 2 including sixth means for developing range increment pulses and whereby said fourth and fifth means develop respective derivatives and height increments during each range increment pulse.

4. A system for determining height in the atmosphere along an energy path above a reference surface as a function of time comprising:
   first means for generating an exponential term including a surface refractive index,
   second means responsive to a product for generating the first derivative of height with respect to range,
   third means for generating the second derivative of height with respect to range,
   fourth means coupled to said third means for generating said product,
   fifth means coupled to said second means for generating height change increments, and
   accumulator means coupled to said fifth means for providing the height of said ray path.

5. The combination of claim 4 further including means coupled to said accumulator means for determining the height of an object in space.

6. A height determining system responsive to range increment pulses, radar timing pulses, transmission angle and to atmospheric refractive characteristics comprising:
   first generator means for developing a first term of the refractive index as a function of height,
   second generator means for developing a second term representing height as a function of the earth's curvature,
   third generator means for developing a third term,
   fourth generator means for developing a fourth term of the first derivative with respect to range,
   fifth generator means for developing a fifth term of the square of the instant transmission angle,
   sixth generator means for developing a sixth term representing the derivative of the refractive parameter times height, and
   seventh generator means for developing a seventh term of height differential.

7. A height determining system responsive to range pulses, transmission angle and to atmospheric refractive characteristics for providing height of a radar path comprising:
   first integrator means responsive to the first derivative of height times an exponential decay constant and to said exponential decay constant times a surface refraction index to generate a first term,
   second integrator means responsive to a first derivative of height with respect to range and to transmission angle to develop a second term as a second derivative of height with respect to range,
   third integrator means responsive to said first and second terms and to an earth radius term to develop a third term,
   fourth integrator means responsive to said first and second terms and to the elevation angle to generate a fourth term,
   fifth integrator means responsive to said third and fourth terms and to said range pulses to develop the first derivative of height as a function of range,
   sixth integrator means responsive to said first derivative of height and said range pulses to develop a fifth term as a differential of height, and
   seventh integrator means responsive to said fifth term to develop said first derivative of height times an exponential decay constant.

8. The combination of claim 7 further including an accumulator coupled to said sixth integrator means for providing the instantaneous height of said radar path.

9. A height finding system comprising:
a first integrator responsive to $d(ch)$ and $cN_s$ to develop the term $d(cN_se^{-ch})$ where $c$ is a decay constant and $N_s$ is a refraction index,
a second integrator responsive to $$d\left(\frac{dh}{dR}\right)$$

to develop the term $$d\left(\frac{dh}{dR}\right)^2$$

where $h$ is height and R is slant range,
a third integrator coupled to said first and second integrators for developing the term $$\left(\frac{1}{r_o}-cN_se^{-ch}\right)d\left(\frac{dh}{dR}\right)^2$$

where $r_o$ is the mean earth's radius,
a fourth integrator coupled to said first and second integrators for developing the term $$\left[1-\left(\frac{dh}{dR}\right)^2\right]d(cN_se^{-ch})$$

a fifth integrator coupled to said third and fourth integrators for developing the term $$d\left(\frac{dh}{dR}\right)$$

said fifth integrator coupled to said second integrator for applying said term $$d\left(\frac{dh}{dR}\right)$$

thereto,
a sixth integrator coupled to said second integrator for developing the term $dh$,
a seventh integrator coupled to said sixth integrator to develop the term $d(ch)$, said seventh integrator coupled to said first integrator for applying said term $d(ch)$ thereto, and
accumulator means coupled to said sixth integrator.
10. The combination of claim 9 further including means coupled to said accumulator means for developing a signal representative of the height of an object in space.
11. A system for determining the height of a radar transmission path comprising:
first intgerator means responsive to signals of $cN_s$ and $d(ch)$ to develop a signal $d(cN_se^{-ch})$ where $c$ is the exponential decay constant, $N_s$ is the surface refraction index and $h$ is the height of the transmission path,
second integrator means responsive to signals of $\sin \epsilon_o$ and $$d\left(\frac{dh}{dR}\right)$$

to develop a signal $$d\left(\frac{dh}{dR}\right)^2$$

where $\epsilon_o$ is the radar transmission angle and R is the slant range,
third means including product forming means coupled to said first and second means and responsive to the signals developed thereby and responsive to signals $$\left(\frac{1}{r_o}-cN_s\right)$$

and $\cos^2 \epsilon_o$ to develop a signal $$d\left(\frac{dh}{dR}\right)$$

said third means being coupled to said second means,
fourth means coupled to said third means and responsive to signals $\sin \epsilon_o$, $dR$ and $$d\left(\frac{dh}{dR}\right)$$

to develop a signal $dh$,
fifth means coupled to said fourth means and responsive to signals $c$ and $dh$ to develop a signal $d(ch)$, said fifth means being coupled to said first means for applying the signal $d(ch)$ thereto,
and sixth means coupled to said fourth means for accumulating the value of the signal $dh$ to provide signals representative of the height of the radar transmission path.

References Cited

UNITED STATES PATENTS

| | | | |
|---|---|---|---|
| 3,007,641 | 11/1961 | Beck et al. | 235—150.31 |
| 3,027,078 | 3/1962 | Steele | 235—150.31 |
| 3,286,258 | 11/1966 | McQueen | 343—125 |

RODNEY D. BENNETT, JR., Primary Examiner

HERBERT C. WAMSLEY, Assistant Examiner

U.S. Cl. X.R.

235—150.31, 151.32; 343—16